United States Patent
Conrad

(10) Patent No.: US 9,561,863 B2
(45) Date of Patent: *Feb. 7, 2017

(54) AIRCRAFT PROGNOSTICS HEALTH SYSTEM

(71) Applicant: Bell Helicopter Textron Inc., Fort Worth, TX (US)

(72) Inventor: Kevin Conrad, Mansfield, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,229

(22) Filed: Dec. 19, 2014

(65) Prior Publication Data

US 2015/0274312 A1    Oct. 1, 2015

Related U.S. Application Data

(60) Provisional application No. 61/971,777, filed on Mar. 28, 2014.

(51) Int. Cl.
| | |
|---|---|
| *B64D 45/00* | (2006.01) |
| *G07C 5/08* | (2006.01) |
| *G01M 5/00* | (2006.01) |

(52) U.S. Cl.
CPC ............ *B64D 45/00* (2013.01); *G01M 5/0033* (2013.01); *G07C 5/0808* (2013.01); *B64D 2045/0085* (2013.01)

(58) Field of Classification Search
CPC ............ B64D 45/00; B64D 2045/0085; G01M 5/0033; G07C 5/0808
See application file for complete search history.

(56) References Cited

U.S. PATENT DOCUMENTS

| | | | |
|---|---|---|---|
| 873,917 | A | 12/1907 | Willson |
| 4,336,595 | A | 6/1982 | Adams et al. |
| 4,733,361 | A | 3/1988 | Krieser et al. |
| 6,219,597 | B1 | 4/2001 | Longere |
| 6,490,543 | B1 | 12/2002 | Jaw |
| 7,908,928 | B2 | 3/2011 | Vik et al. |
| 8,190,304 | B2 | 5/2012 | Feuillebois et al. |

(Continued)

OTHER PUBLICATIONS

Suresh et al., Component Fatigue Life Reliability with Usage Monitor, presented at the American Helicopter Society 63rd Annual Forum, Virginia Beach Convention Center, Virginia Beach, Virginia, May 1-3, 2007, http://web.mit.edu/hchin/Public/HAI/AHS_Papers/Component%20Fatigue%20Life%20Reliability%20with%20Usage%20Monitor.pdf.*

(Continued)

*Primary Examiner* — Yuen Wong

(57) ABSTRACT

According to one example embodiment, a method of assessing reliability of an aircraft component includes identifying, aboard an aircraft, a first probability of failure of the aircraft component installed on the aircraft. One or more measurements representative of at least one load applied against the aircraft component are received. Determined, aboard the aircraft, is a second probability of failure of the aircraft component based on the first probability of failure and the received one or more measurements representative of the at least one load applied against the aircraft component, the second probability of failure representing a probability of failure of the aircraft component after application of the at least one load.

20 Claims, 9 Drawing Sheets

(56) References Cited

U.S. PATENT DOCUMENTS

| | | | |
|---|---|---|---|
| 8,262,019 | B2 | 9/2012 | Schmidt et al. |
| 8,478,457 | B2 | 7/2013 | Bendisch et al. |
| 8,554,459 | B2 | 10/2013 | Johnson et al. |
| 8,571,814 | B2 | 10/2013 | Zhao et al. |
| 8,571,911 | B1 | 10/2013 | Meyer et al. |
| 9,120,581 | B2 | 9/2015 | Costes et al. |
| 2004/0034504 | A1 | 2/2004 | Ulrich et al. |
| 2006/0144997 | A1 | 7/2006 | Schmidt et al. |
| 2006/0235707 | A1 | 10/2006 | Goldstein et al. |
| 2007/0229248 | A1 | 10/2007 | Mott |
| 2009/0234517 | A1 | 9/2009 | Feuillebois et al. |
| 2010/0235109 | A1* | 9/2010 | Zhao .................. G06Q 10/04 702/34 |
| 2011/0208973 | A1 | 8/2011 | Jimenez et al. |
| 2012/0239244 | A1 | 9/2012 | Costes et al. |
| 2012/0323410 | A1 | 12/2012 | Bendisch et al. |
| 2013/0138332 | A1 | 5/2013 | Johnson et al. |
| 2014/0257716 | A1 | 9/2014 | Lajnef et al. |
| 2014/0336954 | A1 | 11/2014 | Bruyneel et al. |
| 2015/0167637 | A1 | 6/2015 | Kooijman et al. |
| 2015/0227659 | A1 | 8/2015 | Andersson et al. |
| 2015/0233789 | A1 | 8/2015 | Balandier |
| 2015/0234951 | A1 | 8/2015 | Andersson et al. |
| 2015/0241313 | A1 | 8/2015 | Kraus |

OTHER PUBLICATIONS

Iyyer, et al., "Architecture for dynamic component life tracking in an advanced HUMS, RFID, and direct load sensor environment", AHS International Forum 65, May 27-29, 2009, Fort Worth, Texas, 24 pages.

Krishnaswamy, Sridhar, "Structural health monitoring for life management of aircraft", FAA JAMS 2008 Technical Review Meeting, Jun. 17-19, 2008, 31 pages.

Polanco, Frank G., "Estimation of structural component loads in helicopters—a review of current methodologies", DSTO-TN-0239, DSTO Aeronautical and Maritime Research Laboratory, Commonwealth of Australia, Feb. 3, 2000, 40 pages.

Office Action for U.S Appl. No. 14/577,314 dated Oct. 15, 2015, 25 pages.

Office Action for U.S Appl. No. 14/577,263 dated Jan. 21, 2016, 13 pages.

Office Action for U.S Appl. No. 14/577,344 dated Nov. 9, 2015, 13 pages.

Final Office Action for U.S. Appl. No. 14/577,314 dated Jun. 6, 2016, 25 pages.

Final Office Action for U.S. Appl. No. 14/577,263 dated Jun. 16, 2016, 14 pages.

Final Office Action for U.S. Appl. No. 14/577,344 dated May 19, 2016, 16 pages.

* cited by examiner

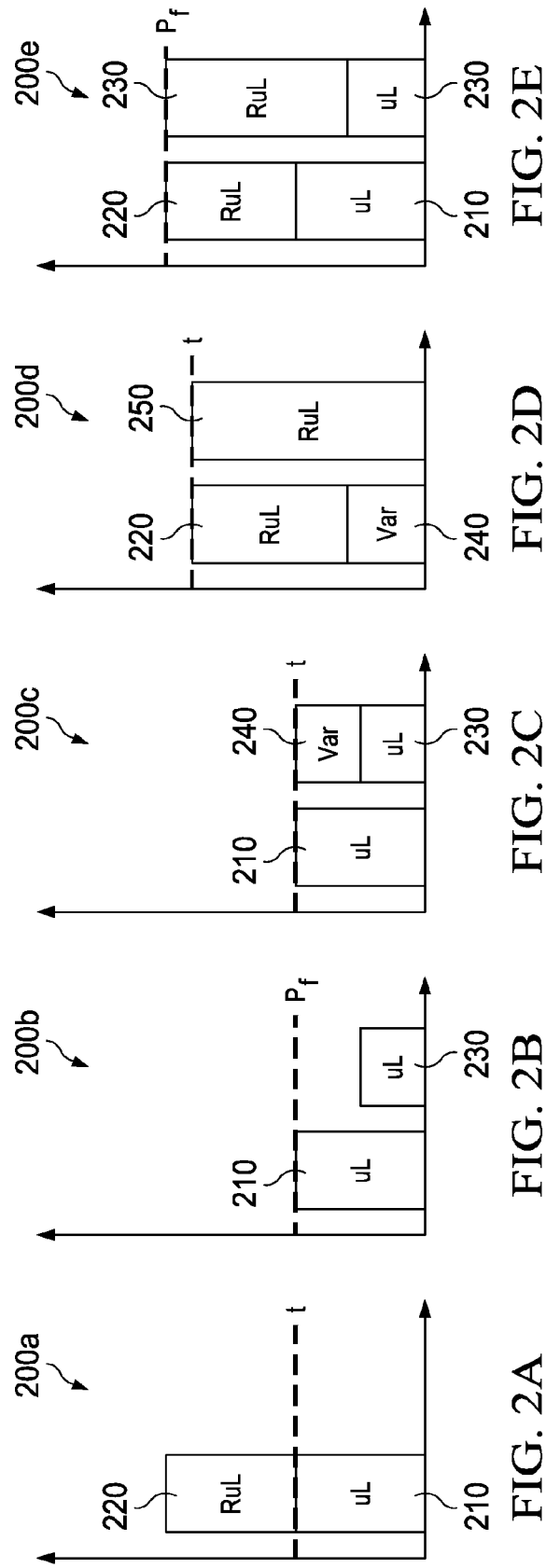

AIRCRAFT PROGNOSTICS HEALTH SYSTEM

RELATED APPLICATIONS

Pursuant to 35 U.S.C. §119 (e), this application claims priority to U.S. Provisional Patent Application Ser. No. 61/971,777, entitled Prognostics Health Director, filed Mar. 28, 2014. U.S. Provisional Patent Application Ser. No. 61/971,777 is hereby incorporated by reference.

TECHNICAL FIELD

This invention relates generally to aircraft health, and more particularly, to an aircraft prognostics health system.

BACKGROUND

An aircraft may perform a variety of different missions. Some missions may subject the aircraft to more damage than other missions. For example, some missions may include more high-load transient maneuvers, whereas other missions may include more low-load, steady-state flight. As another example, some aircraft may be subject to additional damage as the result of shocks, vibrations, and temperature exposure.

One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to extend the useful life of an aircraft component. A technical advantage of one embodiment may include the capability to use usage-based life calculations to assess the remaining useful life of an aircraft component while still satisfying a conservative certification basis. A technical advantage of one embodiment may include the capability to calculate the useful life of an aircraft component on-board the aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 2A-2E show a method of crediting life back to an aircraft component based on variances between expected usage and actual usage according to one example embodiment;

FIG. 3A shows a distribution of S-N curves representing the cycles to failure at various stress values;

FIG. 3B shows a three-parameter Weibull distribution of the distribution of FIG. 3A;

FIG. 3C shows a cumulative distribution function of probability of failure as a function of stress and cycles;

DETAILED DESCRIPTION OF THE DRAWINGS

Figure 1:
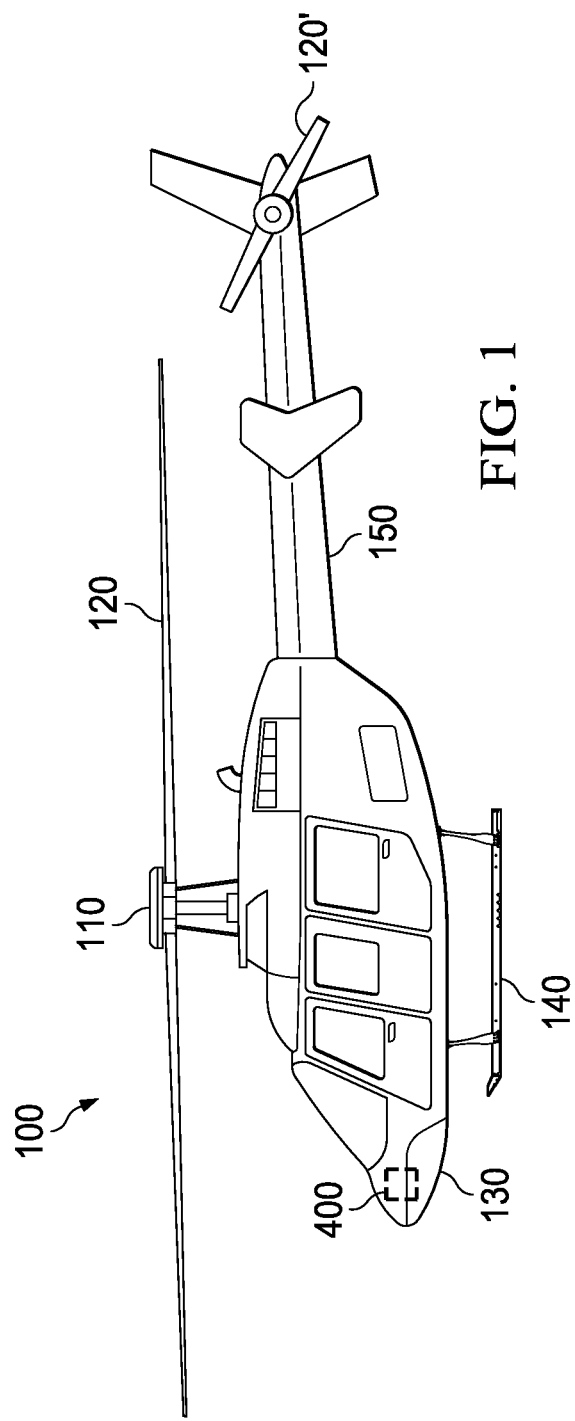
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

Rotorcraft 100 and its components may be subject to a variety of different loads during operation. These loads may be the result of various forces and stresses applied on the aircraft. Some aircraft missions may include more high-load transient maneuvers, whereas other missions may include more low-load, steady-state flight. Some aircraft may also be subject to damage as the result of shocks, vibrations, and temperature exposure. Loads may be the result of activity occurring while the aircraft is operating in the air or when the aircraft is on the ground.

These different loads may reduce the remaining useful life of rotorcraft 100 (or one or more of its components). Remaining useful life of a component may be reduced, for example, if the applied loads increase the probability of failure of the component.

During aircraft design and testing, reductions in remaining useful life may be estimated as a function of time (e.g., flight hours) or cycles. In one example scenario, reliability models may expect that rotorcraft 100 will be subject to certain loads. For example, the reliability models may quantify a normalized (maneuver) frequency spectra built to capture all damaging load cases within the operational flight envelope (life-cycle). As one example, the Federal Aviation Agency (FAA) refers to a rotorcraft usage spectrum as a "composite worst-case" representation. The reliability models may then use these quantified loads to determine when a component should be inspected and when the component should be retired (e.g., by estimating damage per unit time or estimating damage propagation rate per unit time) based on the assumption that all operations reflect the rotorcraft usage spectrum. During routine operations, operational time is logged and deducted from the established maintenance and retirement intervals until the appropriate action is to be taken, regardless of whether or not the thresholds for likelihood of catastrophic failure have been reached based on actual usage.

These reliability models may err on the side of caution by, for example, assuming worst-case scenarios that may only apply to a small subset of rotorcraft operators. After all, it is safer to replace a rotorcraft component too soon rather than too late. Replacing rotorcraft components too soon, however, increases operating costs. Accordingly, teachings of certain embodiments recognize the capability to reduce operating costs by assessing remaining useful life more accurately than reliability models that err too far on the side of caution.

One potential solution may be to develop less-cautious reliability models. Such new models, however, may be subject to scrutiny from administrative agencies, such as the FAA, that are responsible for certifying aircraft and their components. Another potential solution may be to measure actual usage instead of relying on predictive models. Relying solely on measured usage, however, may also suffer from certification issues. For example, failure to assess usage or damage accurately, even after adjusting for uncertainty of measurement/calculation, may result in an underestimation in usage (and thus an overestimation of remaining useful life).

Accordingly, teachings of certain embodiments recognize the capability to use reliability models (such as those described above) to estimate reductions in useful life and then credit back life to the rotorcraft or component based on measured usage. Teachings of certain embodiments recognize that such an approach may satisfy both economic and safety concerns by assessing remaining useful life more accurately than just relying on predictive models but still utilizing the predictive models to prevent remaining useful life from being overestimated.

FIGS. 2A-2E show a method of crediting life back to a component based on variances between expected usage and actual usage according to one example embodiment. The graphs of FIGS. 2A-2E assume that a component has operated over a time period t. Starting with FIG. 2A, graph 200a shows the expected useful life (uL) 210 over the time period t and the expected remaining useful life (RuL) 220 after time period t. In this example, expected used life 210 and remaining useful life 220 may be estimated using predictive reliability models, such as described above.

FIG. 2B features a graph 200b that compares expected used life 210 in the damage (probability of failure) domain with an actual damage 230 based on measured forces and stress. As seen in the example of graph 200b, actual damage 230 determined from force/stress measurements is lower that the predicted damage 210 determined from reliability models.

FIG. 2C features a graph 200c that compares expected used life 210 with actual used life 230 in the time domain. In this example, actual used life 230 represents a measurement of "time" calculated based on measured damage. For example, if a reliability model predicts that fifty operation hours will result in an amount of damage 210, the actual damage measurements may determine that only twenty-five hours of time was actually "used." Thus, although a clock may say that the aircraft operated for fifty hours, the measured damage may show that the aircraft only actually used twenty-five hours of life. This time variance between expected used life 210 (e.g., the equivalent of fifty hours after measurement/calculation knockdown) and the actual used life 230 (e.g., twenty-five hours) is represented by variance (Var) 240. Variance 240 may represent the amount of time the reliability model predicted would be used but the damage measurements proved was not actually used.

Because the time associated with variance 240 was not actually used, teachings of certain embodiments recognize that the time associated with variance 240 may be added back to the predicted remaining useful life 220 to yield actual remaining useful life 250, as shown in graph 200d featured in FIG. 2D. FIG. 2E features a graph 200e that compares the predicted used life 210 and predicted remaining useful life 220 with the actual used life 230 and the actual remaining useful life 250 in the damage (probability-of-failure) domain. As seen in graph 200e, the total probability of failure between predicted life and actual life remains constant.

In the example of FIGS. 2A-2E, actual remaining useful life 250 of a part may be determined based on a change in the probability of failure of the part (such as seen in FIG. 2B). Teachings of certain embodiments recognize the capability to determine this change in the probability of failure using probability-of-failure models and information indicative of part usage and stress.

Figure 3A:
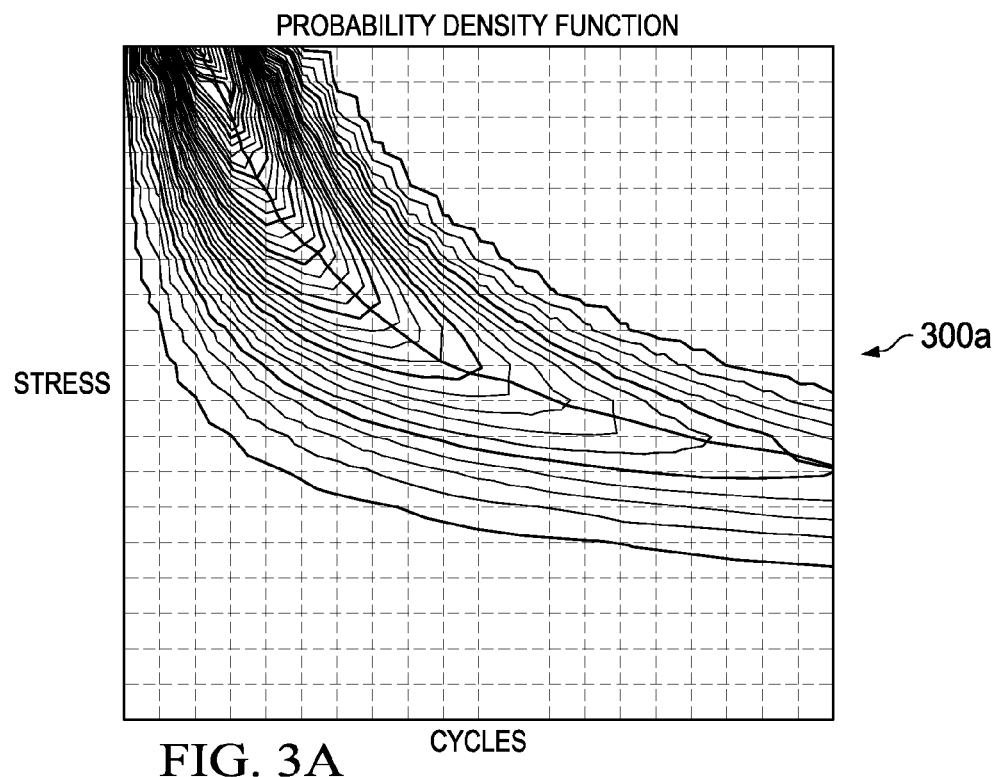
FIGS. 3A-3C show a method of developing a probability-of-failure model according to one example embodiment.
Figure 3B:
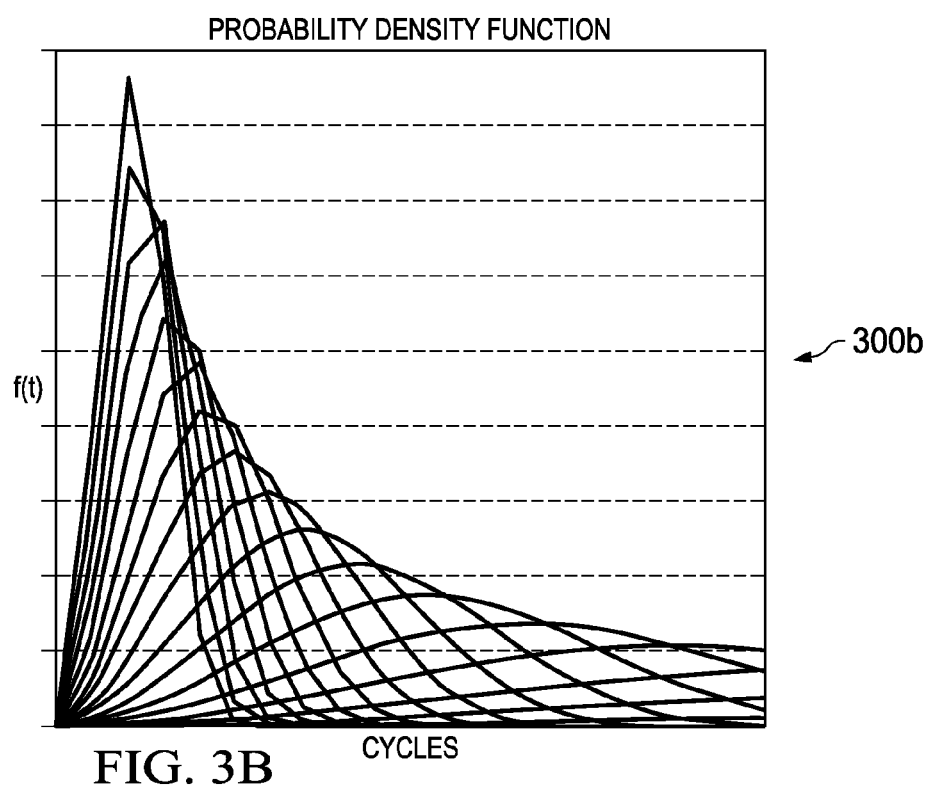
Figure 3C:
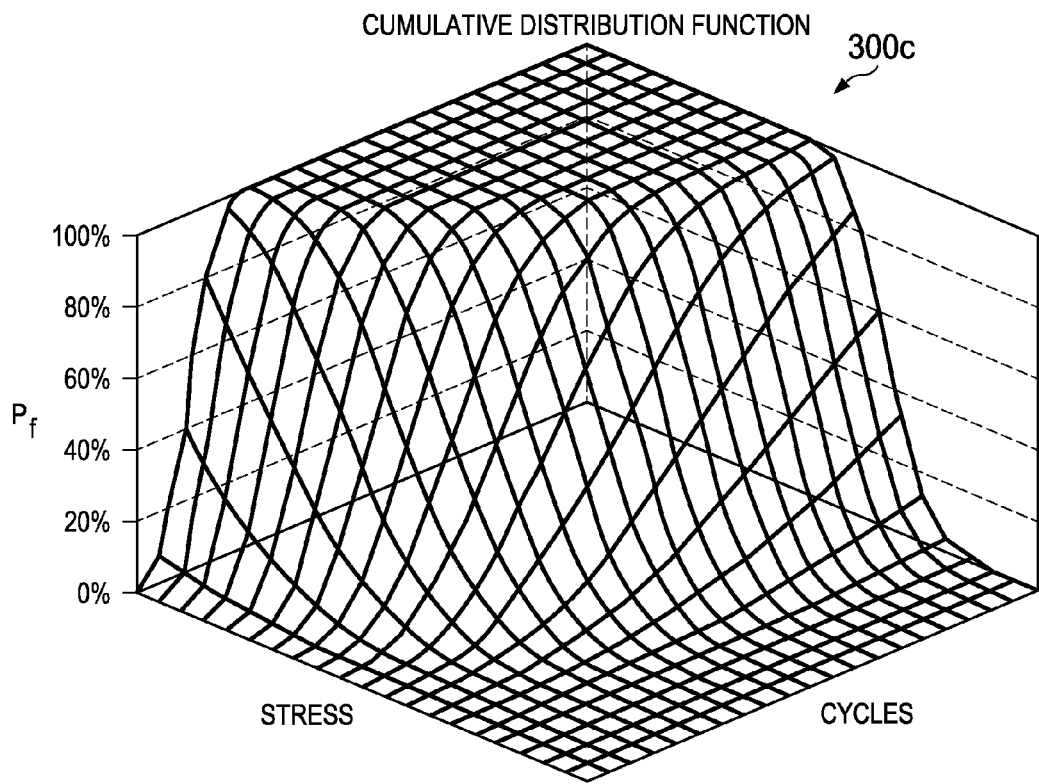

FIGS. 3A-3C show a method of developing a probability-of-failure model according to one example embodiment. The curves shown in FIGS. 3A-3C are approximated.

Starting with FIG. 3A, graph 300a shows a distribution of S-N curves representing the cycles to failure at various stress values. In some embodiments, these distribution values may be collected from sample population test data. The ridgeline shown in FIG. 3A may represent a maximum likelihood estimation.

In FIG. 3B, graph 300b shows a three-parameter Weibull distribution. In this example, the y-axis satisfies the following formula:

$$f(t) = \frac{\beta}{\eta}\left(\frac{t-\gamma}{\eta}\right)^{\beta-1} e^{-\left(\frac{t-\gamma}{\eta}\right)^{\beta}}$$

FIGS. 3A and 3B may represent two ways of showing the same three-dimensional plot. For example, in FIG. 3A, $f(t)$ may represent the z-axis that would run into/out of the page, and in FIG. 3B, stress may represent the z-axis that would run into/out of the page.

FIG. 3C features a graph 300c showing a cumulative distribution function of probability of failure as a function of stress and cycles. In this example, the probability of failure may be defined as:

$$P_f = F(t) = 1 - R(t) = 1 - e^{-(\frac{t-\gamma}{\eta})^\beta},$$

wherein the reliability function may be shown as $$P_r = R(t) = \int_{-\infty}^{t} f(t)dt = e^{-(\frac{t-\gamma}{\eta})^\beta}$$

As seen in FIG. 3C, the probability of failure of a part decreases with stress and cycles. In some scenarios, graph 300c may be analogous to a probability-of-failure landscape. For example, a part may be subject to a first stress for a first number of cycles, then a second stress for a second number of cycles, and then finally a third stress for a third number of cycles. In this example, application of the first stress at the first number of cycles may cause the probability of failure to move from the 0% position (bottom) to a new position along the landscape (hereinafter referred to as the first position). The probability of failure at the first position may be a function of the starting position, the first stress, the first number of cycles, and the landscape between the starting position and the first position.

In this example, any subsequent changes to the probability of failure would be applied relative to the first position. For example, application of the second stress at the second number of cycles may cause the probability of failure to move from the first position to a new (second) position. Thus, the probability of failure at the second position may be a function of (1) the starting (first) position, the second stress, the second number of cycles, and the landscape between the first position and the second position. Accordingly, the probability of failure after application of the second stress at the second number of cycles would be different, for example, if the first position happened to be defined differently.

Accordingly, teachings of certain embodiments recognize the importance of usage history and how the probability of failure of a part may change as a function of usage history. Returning to the previous example, a part may have a first probability of failure after being subject to a first stress for a first number of cycles, then a second probability of failure after being subject to a second stress for a second number of cycles, and then finally a third probability of failure after being subject to a third stress for a third number of cycles. A change in the calculation of the first probability of failure could render the second and third probabilities of failure inaccurate. Examples of changes in calculation may include, but are not limited to, a change in input values (e.g., a change in measured stress or a change in measured number of cycles) and a change in how the calculation is performed (e.g., a change in the mathematical model applied).

Figure 3D:
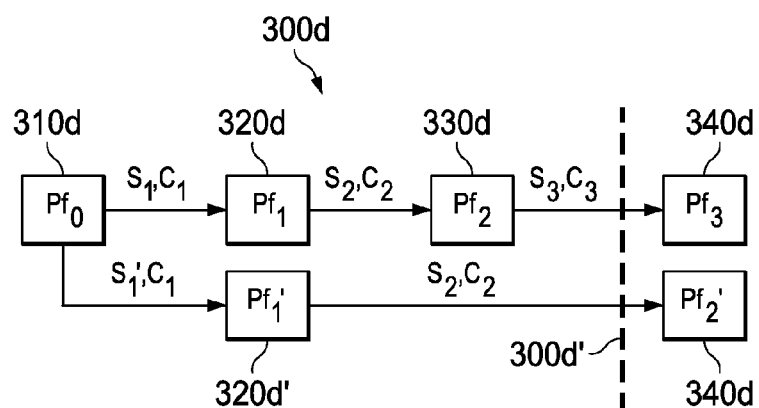
FIG. 3D shows a method of assessing reliability of an aircraft component using successive determinations of probability of failure according to one example embodiment.

FIG. 3D shows a method 300d of assessing reliability of an aircraft component using successive determinations of probability of failure according to one example embodiment. In the example method 300d of FIG. 3D, it is assumed that the aircraft component must be retired once the probability of failure reaches the threshold reliability 300d'. In some embodiments, the value of the threshold reliability 300d' may be determined during testing and may form part of the certification basis. For example, in some embodiments, threshold reliability 300d' may be determined based on unreliability and/or failure propagation rates.

Method 300d starts at step 310d when an initial $Pf_0$ is received. In one example embodiment, the initial $Pf_0$ may be equal to zero because component reliability is presumed to be 100% before the component ever enters service; in another example embodiment, the initial $Pf_0$ may be set at a different value.

In the example of FIG. 3D, a first load is applied to the aircraft component at a first stress $S_1$ for a first number of cycles $C_1$. Application of the first stress at the first number of cycles may result in the probability of failure changing from the initial $Pf_0$ to a new value $Pf_1$ at step 320d. Likewise, application of a second stress $S_2$ for a second number of cycles $C_2$ may result in a new $Pf_2$ at step 330d, and application of a third stress $S_3$ for a third number of cycles $C_3$ may result in a new $Pf_3$ at step 340d. In the example of FIG. 3D, the aircraft component may be retired after application of the third stress for the third number of cycles because $Pf_3$ is greater than the threshold reliability 300d'.

In some circumstances, however, the underlying facts and assumptions that led to calculation of a historical probability of failure may change. For example, a change in the way that $Pf_1$ is calculated may change the values for $Pf_2$ and $Pf_3$, which may render their current values invalid. Accordingly, teachings of certain embodiments recognize the capability to reassess probability of failure.

For example, assume that a change has been made to the load calculations such that $S_1' \neq S_1$. In this example, application of stress $S_1'$ for number of cycles $C_1$ may result in a new $Pf_1'$ at step 320d. Because the calculation of the first probability of failure changed from $Pf_1$ to $Pf_1'$, calculation of the second probability of failure also changes. As a result of application the second stress $S_2$ for the second number of cycles $C_2$, the new $Pf_2'$ is now greater than the threshold reliability 300d', and the aircraft component must be retired.

In some embodiments, calculation of each Pf may lead to additional calculations. For example, knowing an initial remaining useful life, an initial probability of failure $Pf_0$, and an updated probability of failure $Pf_1$ may lead to calculation of an updated remaining useful life. In this example, if the updated probability of failure changes from $Pf_1$ to $Pf_1'$, then the updated remaining useful life may also have to be recalculated based on this change.

Figure 4A:
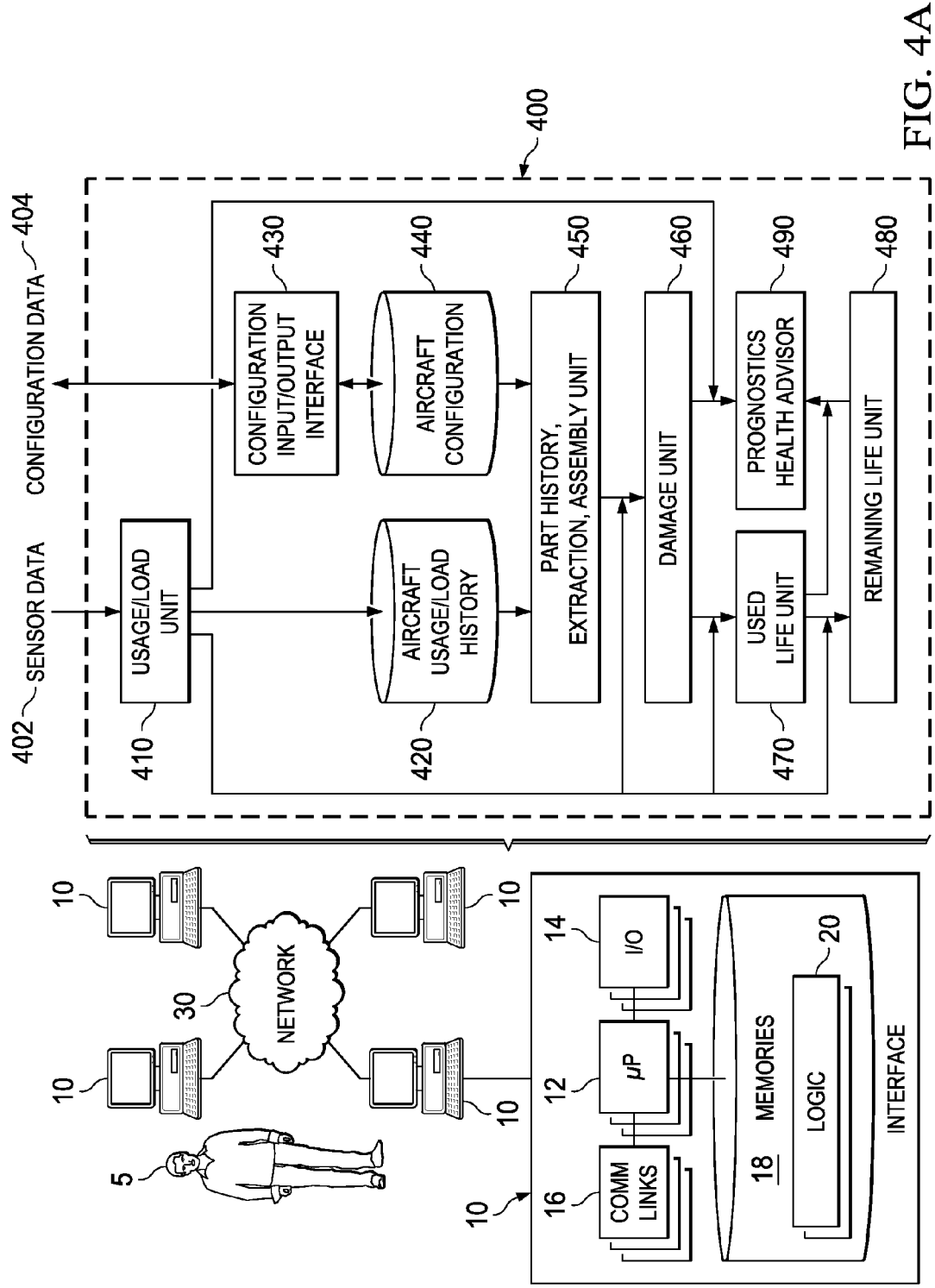
FIG. 4A shows a prognostics health system according to one example embodiment.

Teachings of certain embodiments recognize the capability to apply concepts such as those described above with regard to FIGS. 2A-2E and 3A-3D into a system that assesses aircraft and/or aircraft component health. For example, FIG. 4A shows a prognostics health system 400 according to one example embodiment. In the example of FIG. 4A, prognostics health system 400 features a usage/load unit 410, a usage/load history repository 420, a configuration input/output interface 430, an aircraft configuration repository 440, a part history/extraction/assembly unit 450, a damage unit 460, a used life unit 470, a remaining life unit 480, and a prognostics health advisor 490. In some embodiments, the prognostics health system 400 of FIG. 4A may reflect a scenario in which parts are frequently removed from one aircraft and reinstalled on another aircraft.

Figure 4B:
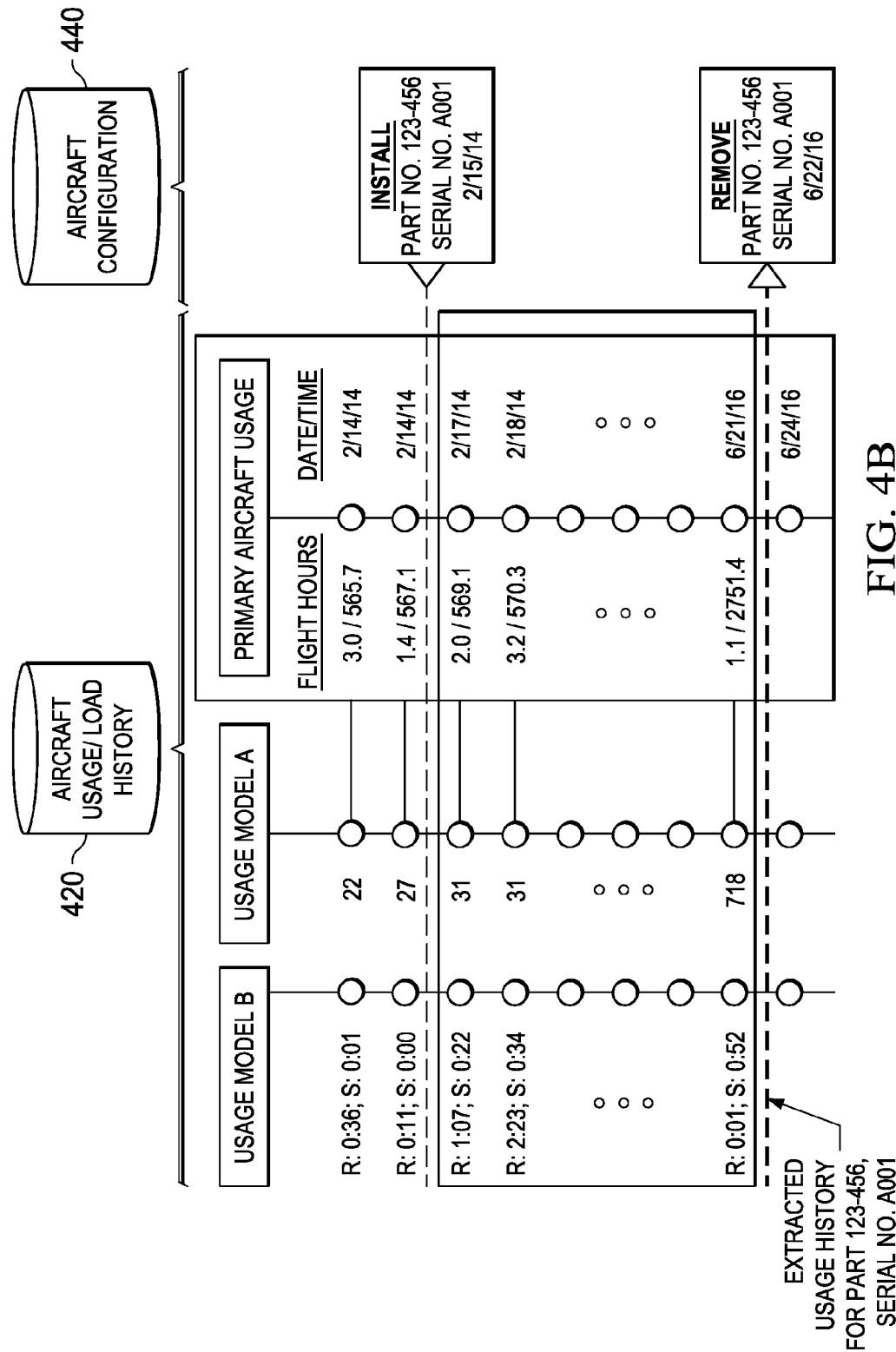
FIG. 4B shows an example embodiment showing how the history/extraction/assembly unit of the prognostics health system of FIG. 4A may correlate aircraft usage/load history with aircraft configuration information.
Figure 4C:
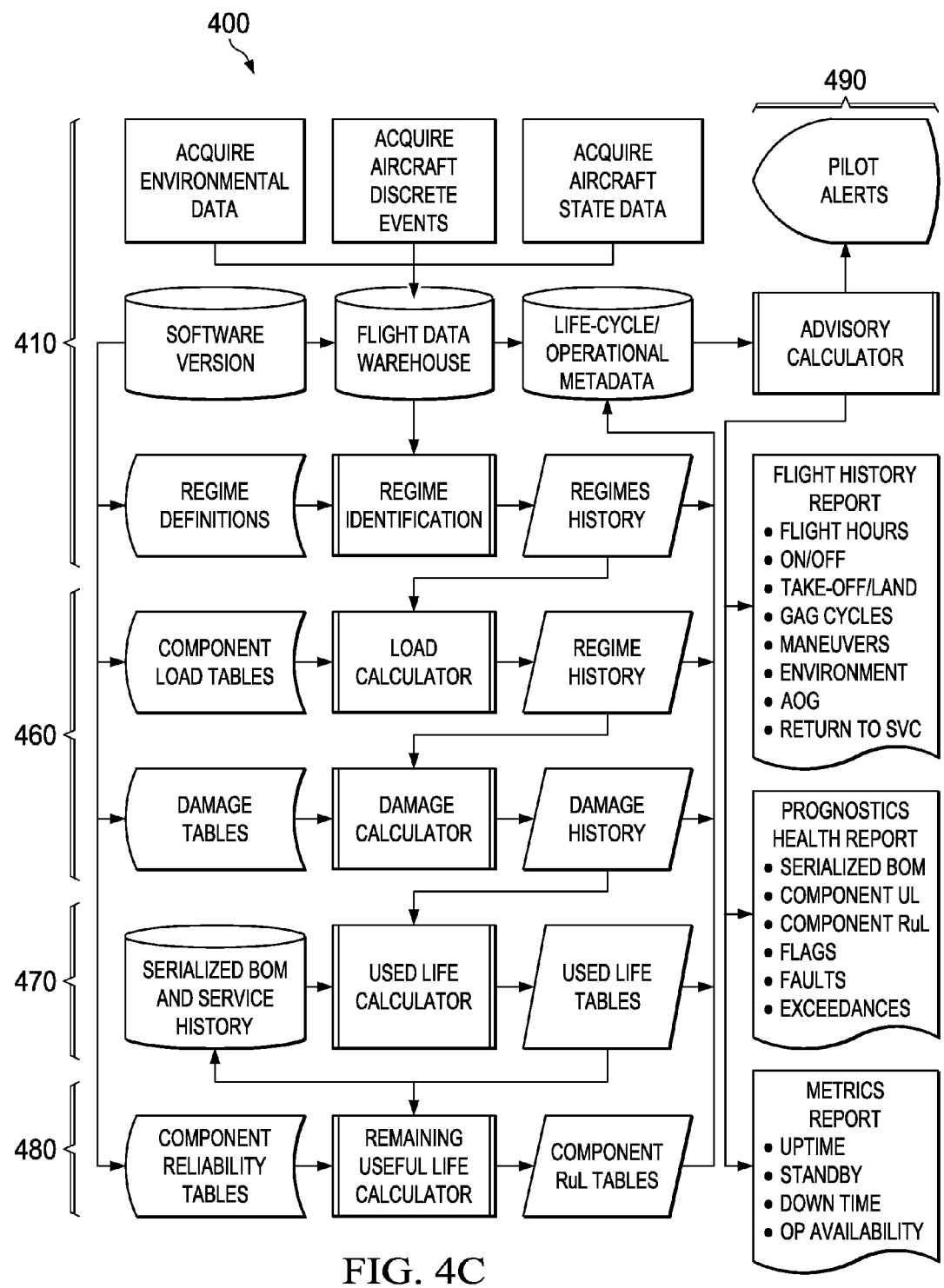
FIG. 4C shows an example configuration of the usage/load history unit, the damage unit, the used life unit, the remaining life unit, and the prognostics health advisor of the prognostics health system of FIG. 4A.

FIG. 4B shows an example embodiment showing how history/extraction/assembly unit 450 may correlate aircraft usage/load history with aircraft configuration information. FIG. 4C shows an example configuration of the usage/load history unit 410, the damage unit 460, the used life unit 470, the remaining life unit 480, and the prognostics health advisor 490 of FIG. 4A. In some embodiments, the example elements of prognostics health system 400 shown in FIG. 4C may reflect a scenario in which regime recognition is used to identify loads.

Teachings of certain embodiments recognize that prognostics health director 400 may be implemented by one or more computers 10 communicating across one or more networks 30 and accessible by a user 5. An example of computer systems 10 may include, but is not limited to, a flight control computer installed on-board an aircraft such as rotorcraft 100. In various embodiments, elements of prognostics health director 400 may be installed on-board an aircraft (as indicated in FIG. 1), off-board (such as at a ground facility), or a combination of the two. For example, in one embodiment, some elements of prognostics health director 400 are installed on-board the aircraft whereas other elements of prognostics health director 400 are installed off-board such that an on-board computer may include the capability to calculate damage and/or remaining useful life of a component during flight as well as the capability to upload/download information to an off-board computer between flights.

Users 5 may access system 400 through computer systems 10. For example, in some embodiments, users 5 may access data stored in usage/load history repository 420, aircraft configuration history 440, as well as other repository associated with other elements of prognostics health system 400. In another example, users 5 may receive outputs from prognostics health advisor 490. Users 5 may include any individual, group of individuals, entity, machine, and/or mechanism that interacts with computer systems 10. Examples of users 5 include, but are not limited to, a service person, pilot, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In the example of FIG. 4A, usage/load unit 410 may receive sensor data 402. Sensor data 402 may represent measurements received from one or more sensors installed on an aircraft that represent at least one load applied against the aircraft over a period of time. Examples of such measurements may include, but are not limited to, aircraft and component environmental data, aircraft and component discrete-event data, aircraft and component state data, and direct and indirect load measurements.

Usage/load unit 410 may also identify loads (and/or load factors) applied to an aircraft and/or its components based on the received sensor data 402. In one example embodiment, usage/load unit 410 identifies directly-sensed loads (e.g., torque, current, etc.) from sensor data 402. In another example embodiment, usage/load unit 410 identifies environmental loads (e.g., vibration, temperature, humidity, etc.) based on the received sensor data 402. In yet another example embodiment, usage/load unit 410 indirectly identifies loads using regime recognition techniques. In some embodiments, usage/load unit 410 may include models that identify loads based on the received sensor data 402. Some models may be relatively simple, such as tracking time (e.g., flight hours) or cycles (e.g., landings). Other models may be more complex, including regime recognition models, structural usage monitoring system (SUMS) models that recognize how the aircraft is flown, and load-estimation techniques (e.g., virtual loads/load synthesis).

Usage/load unit 410 may store a variety of information in usage/load history repository 420, including but not limited to: the received sensor data 402; load/usage information identified based on the received sensor data 402; and historical usage/load information (e.g., historical usage/load information for an aircraft and/or its components). For example, in one embodiment, usage/load unit 410 stores a usage and/or load history for one or more aircraft in a fleet.

Usage/load unit 410 and usage/load history repository 420 may be located on or off an aircraft. For example, in some embodiments, usage/load unit 410 is located on an aircraft and is in communication with usage/load history repository 420 also located on the aircraft. In another example embodiment, parts of usage/load history repository 420 are located on-board an aircraft, whereas other parts of usage/load history repository 420 are located off-board (such as at a ground station or other facility).

Configuration input/output interface 430 may send and receive configuration data 404. Configuration data 404 may represent information identifying which parts are on which aircraft at which time. Teachings of certain embodiments recognize that configuration data 404 may be used to determine which aircraft loads apply to which aircraft components if aircraft components are regularly installed and uninstalled on different aircraft. Configuration data 404 may be received in a variety of different ways. For example, a service person may manually provide configuration data 404 (e.g., keyboard/touchscreen input) when a component is added to or removed from an aircraft. In another example, a check-in system identifies components that have been added to or removed from an aircraft using an electronic identifier (e.g., RFID, bar code, etc.) in communication with a reader associated with configuration input/output interface 430. In yet another example, an aircraft inventory is performed regularly (e.g., between each flight), either manually or using an automated system.

Configuration input/output interface 430 may store a variety of information in aircraft configuration repository 440, including but not limited to: the received configuration data 404; historical aircraft configuration data (e.g., a history of each component that has been installed on a specific aircraft); component information (e.g., information identifying an aircraft component or providing information related to that aircraft component, such as manuals and technical specifications); and historical component information (e.g., usage/load history of a component and component install history).

Configuration input/output interface 430 and aircraft configuration repository 440 may be located on or off an aircraft. For example, in one embodiment, aircraft configuration repository 440 includes storage physically associated with each component as well as additional, remotely-located storage (e.g., storage located elsewhere on-board the aircraft or located remote from the aircraft). For example, each component may include a small memory device that includes information identifying the component as well as other information associated with that component.

Part history/extraction/assembly unit 450 may extract relevant usage/load information for a specific component. For example, FIG. 4B shows an example embodiment in which part history/extraction/assembly unit 450 may utilize information from aircraft configuration repository 440 to determine when a specific component was installed on different aircraft and consult aircraft usage/load history repository 420 to identify the usage/load information on the different aircraft at the times the specific component was installed.

In one example embodiment, part history/extraction/assembly unit 450 consults a "usage to part map" to determine which usage models are relevant to a particular part. For example, the "usage to part map" may suggest multiple parallel models are relevant (e.g., for multiple failure modes). As another example, the "usage to part map" may suggest multiple serial models are relevant (e.g., multiple priority levels to allow for switching to "degraded mode" models—like simple flight hours—when sensors fail). In the example of FIG. 4B, part history/extraction/assembly unit 450 identified two usage models: "usage model A" and "usage model B." Part history/extraction/assembly unit 450 may provide the relevant usage/load information as well as identification of the relevant usage models to damage unit 460.

Once the relevant component usage/load history has been extracted, damage unit 460 may calculate an amount of damage suffered by a component. In one example embodiment, damage unit 460 may utilize damage models that are associated with the usage models (discussed with regard to part history/extraction/assembly unit 450) and/or the component (e.g., component type). In some embodiments, damage unit 460 may also estimate uncertainty in the damage calculations.

In some embodiments, damage unit 460 may calculate both cumulative damage as well as historical damage. For example, usage models and damage models may be subject to change, and damage unit 460 may recalculate past damage using current usage and damage models.

Used life unit 470 may determine an amount of component life used (e.g., actual used life 230), and remaining life unit 480 may determine an amount of component life remaining (e.g., actual remaining useful life 250). Prognostics health advisor 490 may report usage history, metrics, prognostics horizon information (e.g., actual used life and actual remaining useful life), and other information to pilots, service personnel, suppliers, and other people associated with an aircraft or its components.

FIG. 4C shows an example configuration of the usage/load history unit 410, the damage unit 460, the used life unit 470, the remaining life unit 480, and the prognostics health advisor 490 of FIG. 4A. In some embodiments, the example elements of prognostics health system 400 shown in FIG. 4C may reflect a scenario in which regime recognition is used to identify loads.

In the example of FIG. 4C, usage/load history unit 410 features a data warehouse receives environmental data (e.g., vibration, temperature, humidity, etc.), aircraft discrete events data 412 (e.g., discrete loads, torque excursions, etc.), and aircraft state data. A regime identification unit may use physics-based models to identify phases of aircraft operation (e.g., identify maneuvers). If regime identification unit is unable to identify a particular regime, regime identification unit may revert to a default regime (e.g., a worst-case regime such as "max power climb") or use deductive reasoning to eliminate certain regimes (e.g., a max climb rate of 20 ft/min would eliminate "max power climb" as a potential regime) and then choose a default regime among the remaining potential regimes. In some embodiments, clustering logic may be used to identify relevant regimes.

After identifying the relevant regimes, the regime identification unit may populate a regimes history with information identifying when and/or how long the aircraft was operating in each regime. The regime identification unit may also include additional information relevant to failure modes of components. For example, the regime identification unit may include fluid level and quality information relating to drive system failure modes. As another example, the regime identification unit may include flapping measurements relating to rotor system failure modes. As yet another example, the regime identification unit may include temperature and humidity measurements relating to electrical system failure modes.

In this example embodiment, damage unit 460 features a load calculator and a damage calculator. The load calculator uses the regimes history and component load tables to populate a regime load history. The damage calculator uses the regime load history and damage tables to populate a damage history. The damage tables may specify, for example, an assumed damage rate. For example, the damage calculator may determine damage resulting from time spent performing a maneuver as follows:

$$\text{Damage} = \frac{\text{Assumed Damage}}{\text{Assumed Damage}_{In\ Maneuver}} * \text{Measured Time}_{In\ Maneuver}$$

In some embodiments, damage unit 460 applies a cumulative damage theory (e.g., Miner's Rule) to account for how past accrual of damage affects new damage calculations.

In the example of FIG. 4C, used life unit 470 features a used life calculator, and remaining useful life unit 480 features a remaining useful life calculator. The used life calculator determines equivalent life by assessing how cumulative damage changes the probability of failure and then converting that change of probability of failure back into the time domain, such as described with regards to FIGS. 2A-2C. Remaining useful life calculator subtracts a calculated used-life damage index (received from used life unit 470) from a baseline model to identify a variance and then credit that variance towards the remaining useful life, such as described with regards to FIGS. 2C-2E. In some embodiments, the remaining useful life calculator may compare remaining useful life for accidental damage, environmental deterioration, and fatigue models (e.g., based on intrinsic or discrete flaws) to identify minimum time until next maintenance action. The used life calculator and the remaining useful life calculator may use probability-of-failure calculations such as those described with regards to FIGS. 3A-3C.

In this example embodiment, prognostics health advisory 490 may report usage history, metrics, prognostics horizon information (e.g., actual used life and actual remaining useful life), and other information to pilots, service personnel, suppliers, and other people associated with an aircraft or its components. For example, the prognostics health advisory 490 of FIG. 4C features an advisory generator that provides information using pilot alerts; activity history reports that includes information regarding time (e.g., flight hours), cycles (e.g., on/off or takeoffs and landings), maneuvers, environmental, and required service and inspections; prognostics horizon reports that includes information regarding component used life, component remaining useful life, flags, faults, and excedences; and metrics reports that includes information regarding uptime, standby time, down time, and operational availability.

Figure 5A:
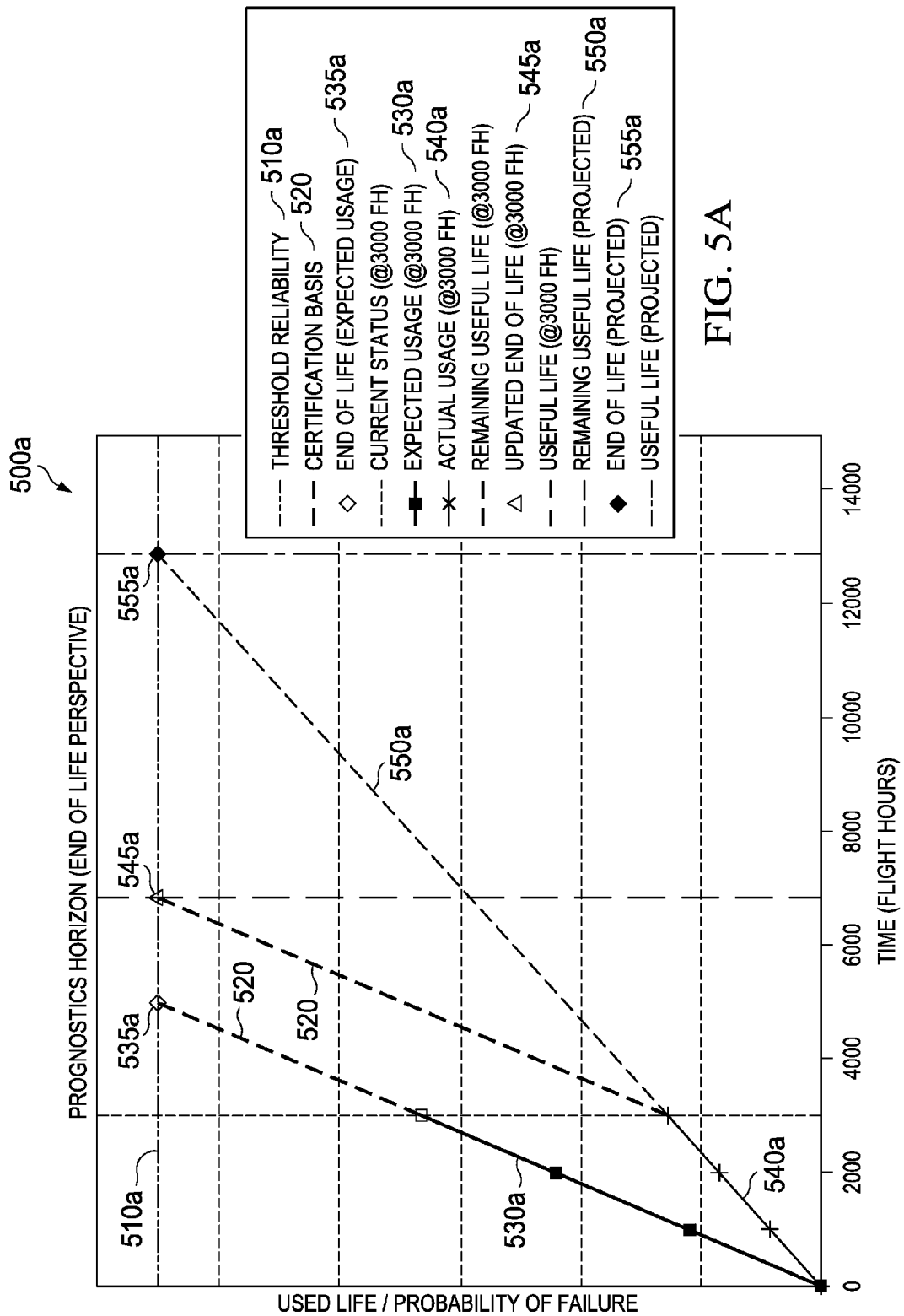
FIG. 5A features a graph showing how calculating remaining useful life as a function of a change in probability of failure adds "life" back to a component as a function of flight hours according to one example embodiment.

As explained above, calculating remaining useful life as a function of a change in probability of failure may result in a variance that adds "life" back to a component (e.g., by increasing the component life remaining until service or retirement). FIG. 5A features a graph 500a showing how calculating remaining useful life as a function of a change in probability of failure adds "life" back to a component as a function of flight hours, and FIG. 5B features a graph 500b showing how calculating remaining useful life as a function of a change in probability of failure adds "life" back to a component as a function of consumed hours.

In the example of graph 500a, a component must be retired once the probability of failure (y-axis) reaches the threshold reliability 510a. In some embodiments, the value of the threshold reliability 510a may be determined during testing and may form part of the certification basis.

In this example, life-expectancy models assume (e.g., for certification reasons) that the probability of failure of a component will increase at a certain rate per flight hour, as indicated by assumed slope 520. Accordingly, the life-expectancy models assume that expected life usage 530a will be used after 3000 flight hours and that expected end of life 535a will occur at approximately 5000 flight hours. In the example of graph 500a, however, probability of failure calculations based on actual usage data show that actual life usage 540a after 3000 flight hours is lower than expected life usage 530a. In fact, the 3000 flight hours of data suggests that the component actually consumes life at lower rate (as indicated by projected slow 550a) than the assumed rate and that the projected end of life 555a will be approximately 13000 flight hours.

In the example of graph 500a, however, the expected end of life is not changed to equal the new projected end of life 555a. For example, the new projected end of life 555a may be too optimistic (being based on only 3000 flight hours of data) and may not satisfy certification requirements. Accordingly, teachings of certain embodiments recognize the capability to update the expected end of life using the actual life usage 540a from the past (the first 3000 flight hours of operation) and the assumed rate of probability of failure from the life-expectancy models for the future (operations after the first 3000 flight hours). In the example of graph 500a, applying assumed slope 520 to actual life usage 540a after 3000 flight hours results in an updated expected end of life 545a.

Figure 5B:
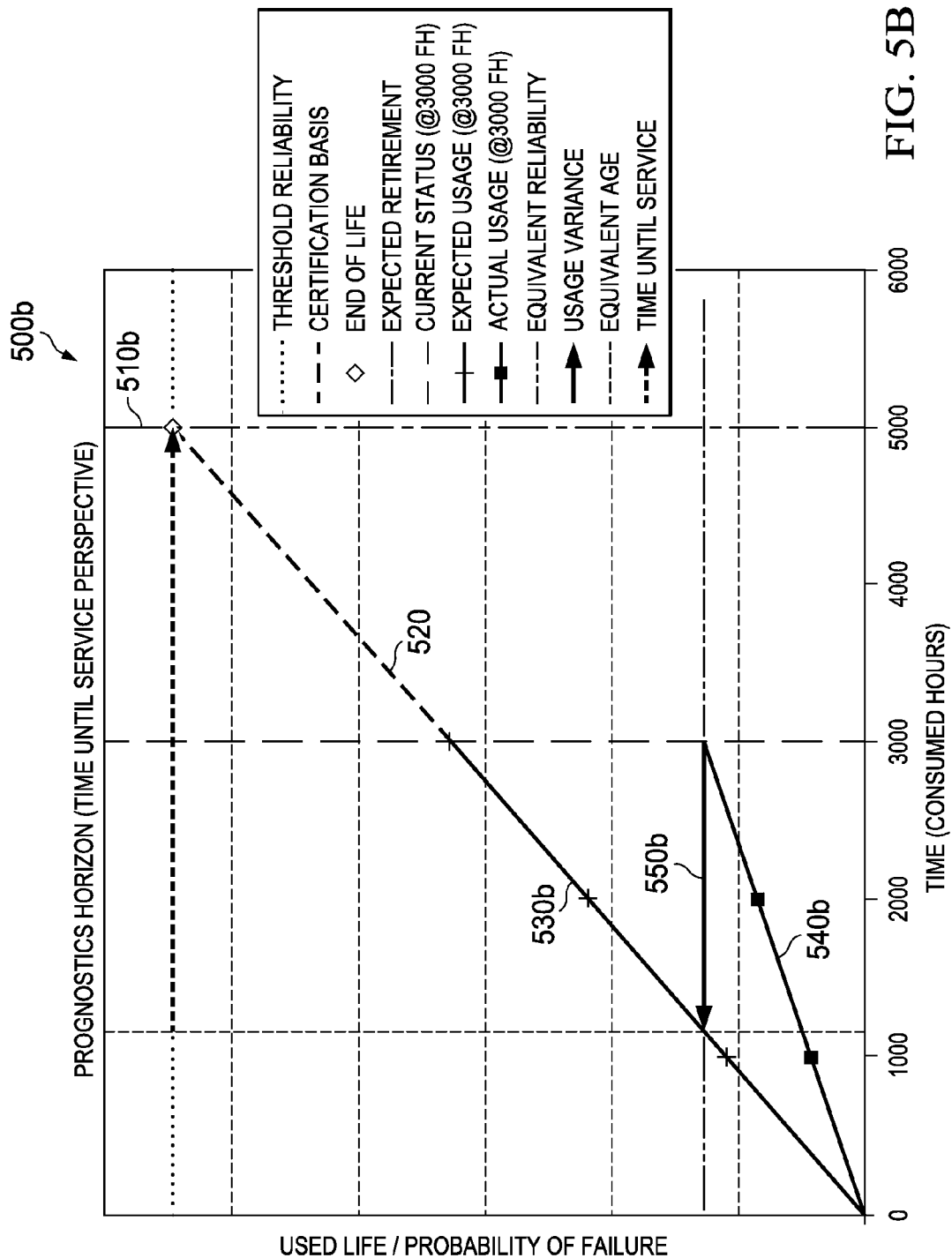
FIG. 5B features a graph showing how calculating remaining useful life as a function of a change in probability of failure adds "life" back to a component as a function of consumed hours according to one example embodiment.

Graph 500b of FIG. 5B shows the example of FIG. 5A as a function of consumed hours rather than flight hours. In the example of graph 500b, the life-expectancy models assume that a component must be retired after 5000 flight hours (as indicated by end of life 510b). This 5000 flight hour value corresponds to the expected end of life 535a from graph 500a.

Similar to the example of FIG. 5A, the life-expectancy models in FIG. 5B assume (e.g., for certification reasons) that the probability of failure of a component will increase at a certain rate per hour, as indicated by assumed slope 520. The life-expectancy models also assume that an hour's worth of life will be "consumed" during every flight hour (i.e., one consumed hour equals one flight hour). Accordingly, the life-expectancy models assume that 3000 hours of life will be "consumed" after 3000 flight hours (as indicated by expected life usage 530b). In other words, the life-expectancy models assume that sixty percent of the component's life will be consumed after 3000 flight hours.

In the example of graph 500b, however, probability of failure calculations based on actual usage data show that actual life usage 540b after 3000 hours is lower than expected life usage 530a. In fact, the 3000 flight hours of data suggests that the component only actually consumed approximately 1200 hours of life, as indicated by usage variance 550b. In this example, the 1800 hour variance is credited back to the component, and the remaining useful life calculations are performed as if the component only consumed 1200 hours of life under the life-expectancy models.

In the examples of FIGS. 5A and 5B, it may not always be possible to credit life back to an aircraft component based on actual usage information. For example, the received measurements may not be sufficient to support calculation of a usage-based change in remaining useful life (e.g., the measurements may not be accurate or may not be complete). Accordingly, teachings of certain embodiments recognize the capability to assess whether the received measurements are sufficient to support calculation of a usage-based change in remaining useful life and then credit life back to the aircraft component only if supported by the assessment. Otherwise, remaining useful life calculations may revert back to the default life calculations using the life-expectancy models.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A method of assessing reliability of a rotorcraft component, comprising:
    identifying, by a processor, aboard a rotorcraft, a first probability of failure of the rotorcraft component installed on the rotorcraft, the first probability of failure representing a probability of failure of the rotorcraft component prior to application of at least one load;
    receiving, by the processor, from one or more sensors installed on the rotorcraft, one or more measurements representative of the at least one load applied against the rotorcraft component;
    determining, by the processor, aboard the rotorcraft, a second probability of failure of the rotorcraft component based on the first probability of failure and the received one or more measurements representative of the at least one load applied against the rotorcraft component, the second probability of failure representing a probability of failure of the rotorcraft component after application of the at least one load;
    determining, by the processor, an equivalent life by assessing a cumulative damage of a change of a probability of failure and then converting the change of the probability of failure back into a time domain;
    subtracting, by the processor, a calculated used-life damage index from a baseline model to identify a variance and then credit the variance towards a remaining useful life of the rotorcraft component so as to extend the remaining useful life of the rotorcraft component; and
    adjusting, by the processor, at least one of an operation and a maintenance of the rotorcraft based on the remaining useful life.

2. The method of claim 1, wherein determining, aboard the rotorcraft, the second probability of failure of the rotorcraft component comprises determining the second probability of failure during operation of the rotorcraft.

3. The method of claim 1, wherein the received one or more measurements further comprises an amount of time during which the at least one load was applied.

4. The method of claim 1, wherein the received one or more measurements further comprises a number of cycles for which the at least one load was applied.

5. The method of claim 1, wherein determining the second probability of failure of the rotorcraft component based on the first probability of failure and the received one or more measurements representative of the at least one load applied against the rotorcraft component comprises:
    recognizing, using the received one or more measurements representative of the at least one load applied against the aircraft component, one or more regimes representative of an activity of the rotorcraft;
    identifying at least one estimated load based on the recognized one or more regimes; and
    determining, aboard the rotorcraft, the second probability of failure of the rotorcraft component based on the first probability of failure and the identified at least one estimated load.

6. The method of claim 5, wherein the activity of the rotorcraft comprises an activity occurring while the rotorcraft is on the ground or while the rotorcraft is in the air.

7. The method of claim 5, wherein recognizing one or more regimes representative of the activity of the rotorcraft comprises:
    identifying a plurality of regimes, each of the plurality of regimes having a different regime definition;
    eliminating at least one of the plurality of regimes based on a conflict between the received one or more measurements and the regime definitions corresponding to the eliminated regimes; and recognizing one or more regimes that were not eliminated.

8. The method of claim 1, wherein: identifying, aboard the rotorcraft, the first probability of failure of the rotorcraft component installed on the rotorcraft further comprises:

identifying a first remaining useful life of the rotorcraft component, the first remaining useful life representing a remaining useful life of the rotorcraft component prior to application of the at least one load; and determining, aboard the rotorcraft, the second probability of failure of the rotorcraft component further comprises determining, based on the first remaining useful life and the received one or more measurements representative of the at least one load applied against the rotorcraft component, a second remaining useful life of the rotorcraft component, the second remaining useful life representing a remaining useful life of the rotorcraft component after application of the at least one load.

9. The method of claim 8, further comprising displaying, in the rotorcraft, the determined second remaining useful life of the rotorcraft component.

10. The method of claim 1, wherein the one or more measurements representative of the at least one load applied against the rotorcraft component are selected from the group consisting of: environmental data, discrete-event data, state data, and direct and indirect load measurements.

11. A system for assessing reliability of a rotorcraft component, comprising:

a rotorcraft comprising a body, a power train coupled to the body and comprising a power source and a drive shaft coupled to the power source, a hub, a rotor blade coupled to the hub, and one or more sensors operable to provide a plurality of measurements; and a prognostics health system, including at least one processor, installed onboard the rotorcraft and operable to:

identify, aboard the rotorcraft, a first probability of failure of the rotorcraft component installed on the rotorcraft, the first probability of failure representing a probability of failure of the rotorcraft component prior to application of at least one load;

receive, from the one or more sensors installed on the rotorcraft, one or more measurements representative of the at least one load applied against the rotorcraft component;

determine, aboard the rotorcraft, a second probability of failure of the rotorcraft component based on the first probability of failure and the received one or more measurements representative of the at least one load applied against the rotorcraft component, the second probability of failure representing a probability of failure of the rotorcraft component after application of the at least one load;

determine an equivalent life by assessing a cumulative damage of a change of a probability of failure and then converting the change of the probability of failure back into a time domain;

subtract a calculated used-life damage index from a baseline model to identify a variance and then credit the variance towards a remaining useful life of the aircraft component so as to extend the remaining useful life of the aircraft component; and adjust at least one of an operation and a maintenance of the aircraft based on the remaining useful life.

12. The system of claim 11, wherein determining, aboard the rotorcraft, the second probability of failure of the rotorcraft component comprises determining the second probability of failure during operation of the rotorcraft.

13. The system of claim 11, wherein the received one or more measurements further comprises an amount of time during which the at least one load was applied.

14. The system of claim 11, wherein the received one or more measurements further comprises a number of cycles for which the at least one load was applied.

15. The system of claim 11, wherein determining the second probability of failure of the rotorcraft component based on the first probability of failure and the received one or more measurements representative of the at least one load applied against the rotorcraft component comprises:

recognizing, using the received one or more measurements representative of the at least one load applied against the rotorcraft component, one or more regimes representative of an activity of the rotorcraft;

identifying at least one estimated load based on the recognized one or more regimes; and determining, aboard the rotorcraft, the second probability of failure of the rotorcraft component based on the first probability of failure and the identified at least one estimated load.

16. The system of claim 15, wherein the activity of the rotorcraft comprises an activity occurring while the rotorcraft is on the ground or while the rotorcraft is in the air.

17. The system of claim 15, wherein recognizing the one or more regimes representative of the activity of the rotorcraft comprises:

identifying a plurality of regimes, each of the plurality of regimes having a different regime definition;

eliminating at least one of the plurality of regimes based on a conflict between the received one or more measurements and the regime definitions corresponding to the eliminated regimes; and recognizing one or more regimes that were not eliminated.

18. The system of claim 11, wherein identifying, aboard the rotorcraft, the first probability of failure of the rotorcraft component installed on the rotorcraft further comprises:

identifying a first remaining useful life of the rotorcraft component, the first remaining useful life representing a remaining useful life of the rotorcraft component prior to application of the at least one load; and determining, aboard the rotorcraft, the second probability of failure of the rotorcraft component further comprises determining, based on the first remaining useful life and the received one or more measurements representative of the at least one load applied against the rotorcraft component, a second remaining useful life of the rotorcraft component, the second remaining useful life representing a remaining useful life of the rotorcraft component after application of the at least one load.

19. The system of claim 18, further comprising displaying, in the rotorcraft, the determined second remaining useful life of the rotorcraft component.

20. The system of claim 11, wherein the one or more measurements representative of the at least one load applied against the rotorcraft component are selected from the group consisting of: environmental data, discrete-event data, state data, and direct and indirect load measurements.

* * * * *